(12) United States Patent
Daenuwy et al.

(10) Patent No.: US 9,677,909 B2
(45) Date of Patent: Jun. 13, 2017

(54) ELECTRICITY METER

(71) Applicant: Itron, Inc., Liberty Lake, WA (US)

(72) Inventors: George Daenuwy, Bekasi (ID); Hamdani Azali, Bekasi (ID)

(73) Assignee: Itron, Inc.

( * ) Notice: Subject to any disclaimer, the term of this patent is extended or adjusted under 35 U.S.C. 154(b) by 0 days.

(21) Appl. No.: 14/764,167

(22) PCT Filed: Jan. 29, 2014

(86) PCT No.: PCT/IB2014/058643
§ 371 (c)(1),
(2) Date: Jul. 28, 2015

(87) PCT Pub. No.: WO2014/118717
PCT Pub. Date: Aug. 7, 2014

(65) Prior Publication Data
US 2016/0084672 A1    Mar. 24, 2016

(51) Int. Cl.
| | | |
|---|---|---|
| *G08C 19/16* | (2006.01) | |
| *G01D 4/00* | (2006.01) | |
| *G06Q 30/04* | (2012.01) | |
| *G06Q 50/06* | (2012.01) | |
| *G07F 15/00* | (2006.01) | |
| *G06Q 20/28* | (2012.01) | |
| *B60L 11/18* | (2006.01) | |

(52) U.S. Cl.
CPC .......... *G01D 4/002* (2013.01); *B60L 11/1816* (2013.01); *B60L 11/1848* (2013.01); *G06Q 20/28* (2013.01); *G06Q 30/04* (2013.01); *G06Q 50/06* (2013.01); *G07F 15/00* (2013.01); *G07F 15/003* (2013.01); *G07F 15/005* (2013.01); *Y02T 90/12* (2013.01); *Y02T 90/128* (2013.01)

(58) Field of Classification Search
CPC . B60L 11/1816; B60L 11/1848; G01D 4/002; G07F 15/00; G07F 15/003; G07F 15/005; Y02T 90/12; Y02T 90/128
USPC ............................ 340/870.18, 870.19, 870.2
See application file for complete search history.

(56) References Cited

U.S. PATENT DOCUMENTS

| | | | | |
|---|---|---|---|---|
| 4,093,997 A * | 6/1978 | Germer | ................ | G04D 7/1257 377/29 |
| 4,516,213 A * | 5/1985 | Gidden | ................ | G01R 21/007 324/103 R |
| 5,894,422 A * | 4/1999 | Chasek | ................. | G01D 4/006 340/870.03 |
| 9,007,016 B2 * | 4/2015 | Yukizane | ............ | B60L 11/1811 307/10.1 |
| 9,048,674 B2 * | 6/2015 | Gregg | ................. | B60L 11/1838 |
| 9,058,578 B2 * | 6/2015 | Jones | ................. | G06Q 10/0631 |

(Continued)

*Primary Examiner* — Ojiako Nwugo
(74) *Attorney, Agent, or Firm* — Lee & Hayes, PLLC

(57) ABSTRACT

There is provided an improved method of managing the supply of electricity. The method comprises transferring, via contactless communication, first data from an electricity meter to a portable storage medium. The first data may be historical data collected by the electricity meter and related to the supply of electricity by the electricity meter. The method further comprises transferring, via contactless communication, second data from the portable storage medium to the electricity meter. The second data comprises instruction for the electricity meter to supply electricity.

18 Claims, 5 Drawing Sheets

(56) References Cited

U.S. PATENT DOCUMENTS

| | | | |
|---|---|---|---|
| 2012/0200426 A1* | 8/2012 | DiLuciano | H04L 41/065 340/870.07 |
| 2012/0203388 A1* | 8/2012 | DiLuciano | G06Q 10/04 700/292 |
| 2012/0326838 A1* | 12/2012 | Stocker | B60L 11/1842 340/5.8 |
| 2013/0024306 A1* | 1/2013 | Shah | G06Q 20/32 705/17 |
| 2013/0311017 A1* | 11/2013 | Matsunaga | B60L 3/00 701/22 |

* cited by examiner

ELECTRICITY METER

This application is a 371 National Phase of Patent Cooperation Treaty Application number PCT/IB2014/058643, filed Jan. 29, 2014, which claims the benefit of priority to GB Application No. 1320779.0, filed on Nov. 25, 2013, and GB Application No. 1301582.1, filed on Jan. 29, 2013, which are all incorporated herein by reference.

FIELD

The present disclosure relates to the field of electricity supply, electricity meters, charging stations for electric vehicles and electric vehicles. Aspects of the present disclosure relate to a method of managing the supply of electricity, an electricity meter, a vending terminal for purchasing electricity and a portable medium for managing the supply of electricity. Embodiments relate to a prepaid electricity meter using the Standard Transfer Specification "STS".

BACKGROUND

Post-paid electricity meters allow a user to pay for electricity after they have used it. Typically, an electricity provider will obtain a meter reading and invoice a customer for their electricity consumption. Such systems are convenient for the customer. Advantageously, meter readings provide electricity providers with useful information about the electricity consumption of their customers.

In contrast, prepaid electricity meters require a user to make an advanced payment before electricity can be used. For example, prepaid systems may be provided to customers that are considered to be a credit risk.

The STS is a standard regarding prepaid electricity meters and the vending terminal used to pay for electricity in advance. Prepaid electricity meters based on the STS protocol are common in many parts of the world. In this system, a prepay user purchases a 20-digit code which they may then enter into a keypad of the prepaid electricity meter to add credit. The 20-digit code may be purchased from a vending terminal such as an ATM. In accordance with the STS, the code is encrypted. Credit is used by consuming electricity.

Such systems are disadvantageous because they require a user to physically enter a 20-digit code into their electricity meter. User error may occur when the electricity meter is inconveniently positioned, for example. Furthermore, such systems do not require a customer to provide meter readings and so electricity providers may not receive information about the electricity consumption of their prepay customers. In this respect, existing prepay systems, such as systems based on the STS, may be considered "one-way". The present disclosure addresses these limitations.

SUMMARY

Aspects of an invention are defined in the appended independent claims.

There is provided an improved method of managing the supply the electricity. This is achieved by using a portable storage device, such as a contactless card or smartcard, to (1) transfer purchase data from a vending terminal to an electricity meter and (2) retrieve data from the electricity meter. Accordingly, there is no requirement on the user to manually enter a purchase code on the keypad of their electricity meter. Furthermore, electricity providers may obtain useful information from prepaid customers.

The system provides a two-way exchange of information with the electricity meter. In particular, the system allows the electricity provider to obtain useful information from the electricity meter such as historic data relating to consumption. Notably, this is achieved without the need to connect the electricity meter to communications network such as a telephone network or the internet. The electricity meter may therefore be considered "off-line". Accordingly, the system may also be used with electricity meters in remote areas and other areas which do not have access to the internet or suitable communication links for data exchange. An "on-line" terminal may be used to read the portable storage medium, download the historical data retrieved from the electricity meter and transmit the data to the electricity supplier.

Optional features are defined in the dependent claims.

BRIEF DESCRIPTION OF THE DRAWINGS

Embodiments of the present disclosure will be described now, by way of example only, with reference to the appended drawings, in which.

In the drawings, like reference numerals refer to like parts.

DETAILED DESCRIPTION OF EMBODIMENTS

An electricity meter may be used to manage the supply of electricity to a building or electric vehicle, for example. The term "manage" encompasses controlling and monitoring the electricity supply. For example, the electricity meter may control whether or not electricity is supplied and, if so, how much electricity is supplied. The electricity meter may also monitor matters such as consumption history and consumption habits, for example.

Electricity may be prepaid at a vending terminal. For example, in accordance with the STS, a user may purchase a voucher comprising a 20-digit code from a vending terminal. The voucher may be redeemed at the electricity meter, by entering the 20-digit code into a keypad, to provide electricity credit.

In overview, the present disclosure provides an improved method of managing the supply of electricity. This is achieved using a portable storage medium and two-way contactless communications with the electricity meter. The contactless communications may be performed using short-range radio waves and induction loops, as known in the art.

The method comprises two data transfers between a portable storage medium and the electricity meter. The two data transfers may occur in succession. The transfers may occur as the result of a user bringing the portable storage device into close proximity with a contactless transceiver of the electricity meter.

In a first data exchange, first data is transferred from the electricity meter to the portable storage medium. This first communication may be considered a "monitoring" step and allows for information from the electricity meter to be captured.

In a second data exchange, second data is transferred from the portable storage medium to the electricity meter. The second data comprises instruction for the electricity meter related to the supply of electricity. For example, the instruction may be instruction for the electricity meter to supply a certain quantity of electricity. The second data may therefore be considered "control data" and this second communication may be considered a "controlling" step.

Figure 1:
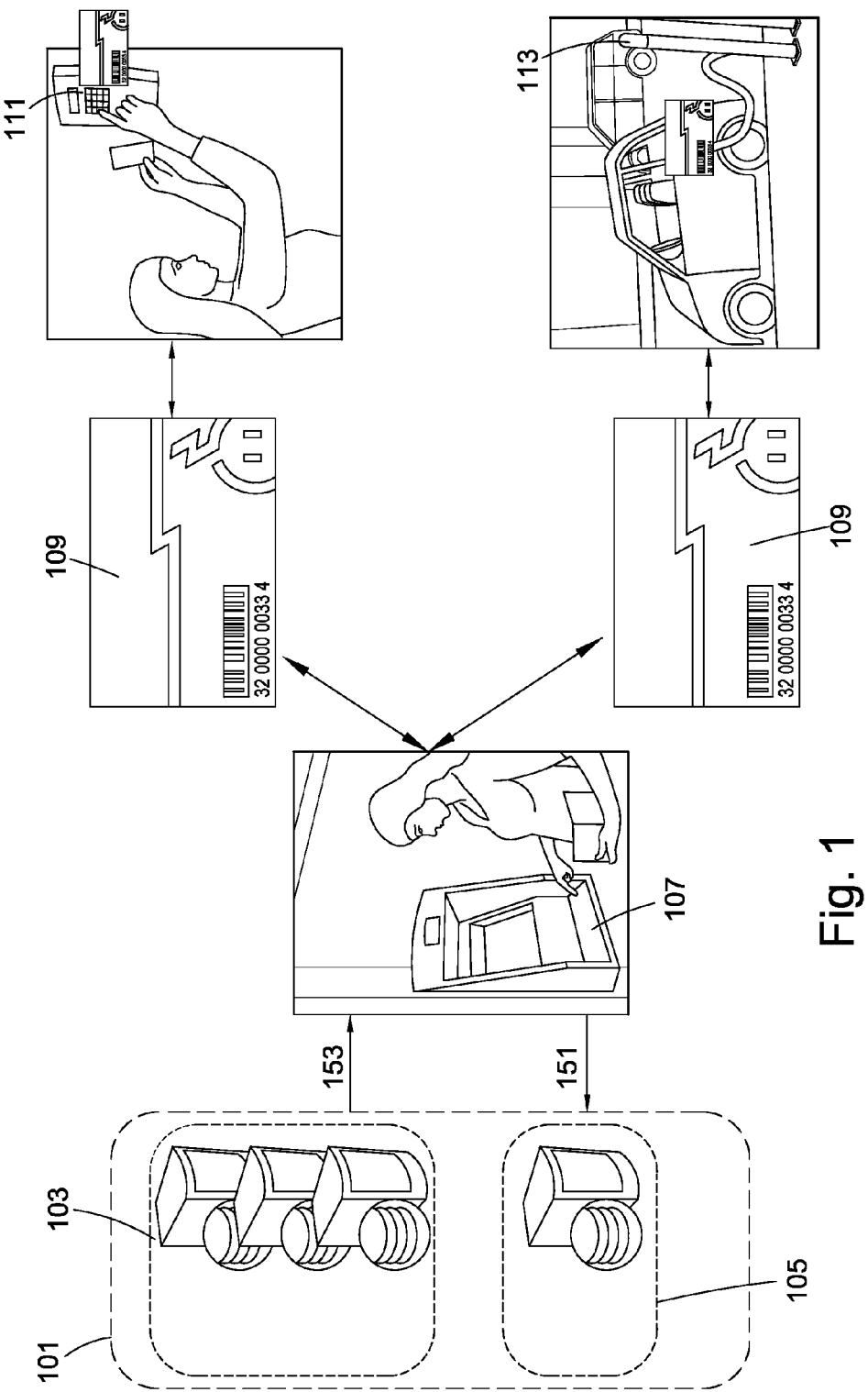
FIG. 1 shows a system for prepaying for electricity in accordance with embodiments of the present disclosure.

FIG. 1 shows a vending terminal 107 configured for use with a portable storage medium 109 such as a prepaid smartcard. The vending terminal 107 is communicatively-coupled to a data centre 101 comprising a token generating service 103 and a database and billing system 105. The vending terminal 107 is arranged to receive first data from the portable storage medium 109 related to an electricity meter and transmit the first data 151 to the database and billing system 105. The token generating service 103 is arranged to transmit second data 153 to the portable storage medium 109, via the vending machine 107, related to electricity credit or "tokens" purchased by the user. As shown in FIG. 1, a user may use the prepaid electricity tokens to provide credit on a domestic electricity meter 111 and/or an electric vehicle charging unit 113, for example.

Figure 2:
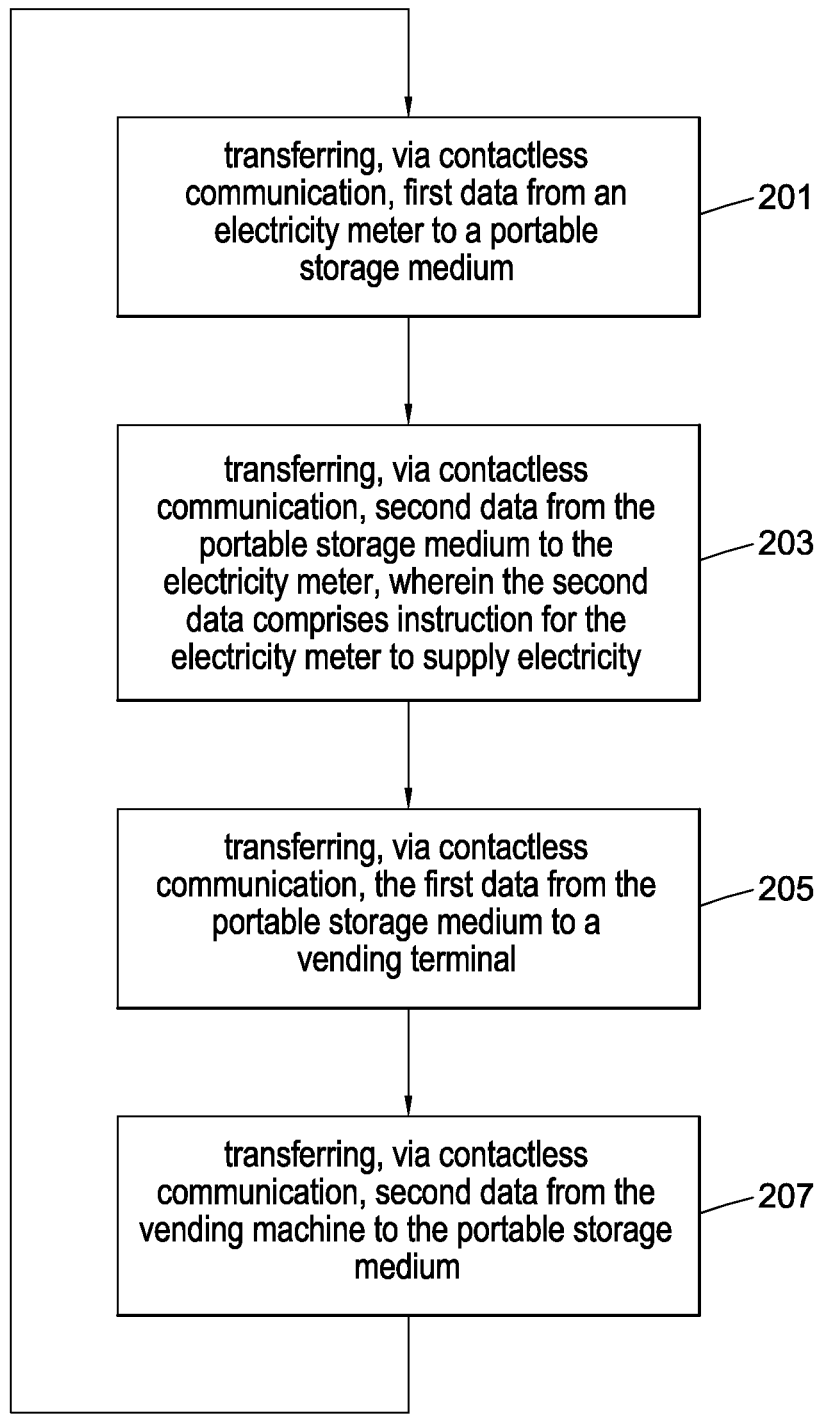
FIG. 2 shows a method in accordance with embodiments of the present disclosure.

With reference to FIG. 2, there is therefore provided a method of managing the supply of electricity, the method comprising: transferring, via contactless communication, first data from an electricity meter to a portable storage medium (step 201); and transferring, via contactless communication, second data from the portable storage medium to the electricity meter (step 203), wherein the second data comprises instruction for the electricity meter to supply electricity.

This improved method does not require a user to enter a code into the keypad of the electricity meter. A faster, more convenient and more reliable method for providing input to the electricity meter is therefore provided. For example, problems in code-based systems—such as STS—caused by a user incorrectly entering prepayment code are avoided.

Notably, data is also transferred from the electricity meter to the portable storage medium. The method therefore provides means for retrieving useful data from the electricity meter which may not otherwise be available. It can be understood that this method is particularly advantageous for prepaid electricity meters and off-line electricity meters. However, the method is suitable for any type of electricity meter.

In an embodiment, the First data is historical data collected by the electricity meter in the relation to the electricity supply. For example, the First data may comprise electricity consumption data, transaction data related to past electricity purchases, end of month "EOM" billing data or end of billing "EOB" data, tamper information and/or data related to the amount of remaining credit on the electricity meter. The above types of data are included by way of example only and the skilled person will appreciate that the First data may comprise other useful data from the meter.

In an embodiment, the first data is transferred from the electricity meter to the portable storage medium before the second data is transferred from the portable storage medium to the electricity meter. However, in other embodiments, the second data is transferred before the first data.

The retrieved data may be extracted from the portable storage medium. The data may be extracted from the portable storage medium by a device remote from the electricity meter.

In an embodiment, a vending terminal generates the second data in response to prepayment by a customer. That is, the vending terminal creates data, or a data packet, which includes information indicating that electricity credit has been purchased. The data may be encrypted to help prevent theft.

In an embodiment, the method of managing the supply of electricity further comprises transferring, via contactless communication, the second data from a vending terminal to the portable storage device (step 207 of FIG. 2).

It can be understood that the vending terminal may be some distance from the electricity meter. However, using the portable storage medium, purchase information may be transferred to the electricity meter. For the reasons given above, the data transfers are advantageously performed by contactless communication.

The electricity meter is arranged to receive a contactless communication from the portable storage device and, if necessary, decrypt the received data. The received data indicates how much credit was purchased by the customer at the vending terminal. Credit is accordingly added to the electricity meter such that the user is supplied with electricity—at least until the credit runs out.

The portable storage medium is therefore arranged to receive second data from a vending terminal by a contactless communication and transmit the second data to an electricity meter by a contactless communication.

There is therefore provided a method of transferring purchase information from a vending terminal to an electricity meter, the method comprising: transferring, via contactless communication, second data from a vending terminal to a portable storage medium; and transferring, via contactless communication, the second data from the portable storage medium to an electricity meter, wherein the second data comprises instruction for the electricity meter to supply electricity.

In an embodiment, the method further comprises transferring, via contactless communication, the first data from the portable storage medium to the vending terminal (step 205 of FIG. 2). That is, the same vending terminal may also receive the first data. For example, the first data may be transferred to the vending terminal the next time the customer uses the vending terminal to purchase electricity.

The vending terminal may be on-line and the vending terminal may therefore forward the first data to the electricity supplier by a communication link. It can therefore be understood that useful data may be retrieved by an electricity supplier even when the associated electricity meter is off-line or meter readings are not provided. In other words, no direct communication link between the electricity meter and electricity provider is required to obtain useful information.

In an embodiment, the instruction for the electricity meter to supply electricity is instruction for the electricity meter to permit supply of a predetermined quantity of electricity. That is, a limited amount of electricity.

In an embodiment, the second data comprises data which complies with the STS. The predetermined quantity of electricity may be a number of "units" in accordance with the STS. These units may be referred to as STS units. In embodiments, the data which complies with the STS comprises a 20-digit encrypted number.

The skilled person will understand that other protocols for transferring encrypted data may be suitable and the encrypted data may comprise any number of digits.

However, advantageous embodiments use STS because many existing prepaid meters operate using this protocol. Methods disclosed herein may therefore be easily implemented by modifying existing meters to include contactless technology and the necessary driving technology to deliver the STS code via contactless communication rather than manually by keypad. For example, this may be achieved by adding a contactless module to existing meters.

In an embodiment, the predetermined quantity of electricity is a number of units of electricity. These units may be converted into kWh in accordance with a tariff. In an embodiment, the number of units is converted into a number of Watt-hours, or kilowatt-hours, in accordance with a tariff set by the vending machine or electricity meter. Advantageously, this provides the electricity provider with improved control over how their electricity is charged. For example, an electricity supplier may wish to charge a higher tariff for peak hour consumption.

In an alternative embodiment, the predetermined quantity of electricity is a number of kWh. It may be readily understood that a customer may wish to pre-purchase, for example, 10 kWh of electricity.

The skilled person will understand that a variety of metrics may be used in accordance with the present disclosure to quantify the amount of electricity purchased and supplied. The embodiments disclosed herein are by way of example only.

In an embodiment, the portable storage medium is a handheld contactless card or contactless smartcard. The skilled person will understand that the portable storage medium may take any physical form such as a key, card, token, fob or equivalent thereof.

Advantageously, cash transactions are not required and the portable storage medium does not store a currency value. The portable storage medium in accordance with the present disclosure may therefore be distinguished from currency-based cards—such as currency-based NFC cards—which carry currency. Embodiments relate to a STS system in which security is provided by the STS protocol and using prepaid STS units.

It can be understood that aspects of the present disclosure relate to an electricity meter arranged to: receive, via a contactless communication, second data from a portable storage medium, wherein the second data comprises instruction for the electricity meter to supply electricity; and transmit, via contactless communication, first data to the portable storage medium.

Optionally, the data is encrypted and the electricity meter comprises a processor arranged to decrypt the first data. The skilled person will appreciate that the electricity meter comprises means for controlling the electricity supply such as turning the supply on and off. In an embodiment, to achieve this, the electricity meter further comprising a contactor arranged to regulate the supply of electricity. Optionally, the contactor is a relay. However, the skilled person will understand that a variety of means may be used directly or indirectly by the electricity meter to control the supply of electricity.

It can be equally understood that the present disclosure also relates to a vending machine and a portable storage medium.

There is provided a vending terminal for purchasing electricity, the vending terminal arranged to: transmit, via contactless communication, second data to a portable storage medium, wherein the second data comprises instruction for an electricity meter to supply electricity; receive, via contactless communication with portable storage medium, second data from the electricity meter.

There is also provided a portable storage medium for managing the supply of electricity, the portable storage medium arranged to store and transfer, via contactless communication, second data from a vending terminal, wherein the second data comprises instruction for an electricity meter to supply electricity; and store and transfer, via contactless communication, second data from the electricity meter.

It can be understood that the improved method in accordance with the present disclosure is suitable for any applicable in which electricity is delivered. By way of example, the disclosed method is applicable to managing the supply of electricity to a building or the supply of electricity to an electric vehicle. In an embodiment, the same portable storage medium may be used to transfer credit to a plurality of electricity meters. For example, the same smartcard may be used to provide credit on a home system and one electric vehicle.

In an embodiment, the method may be used to manage energy transfer from a charging station to an electric vehicle. All transactions may be recorded at the vehicle and at the charging station.

There is also therefore provided a car charging station and a method of managing the charging of an electric vehicle.

In a further embodiment, the system may include metrology in the charging station and a contactless prepaid meter in the vehicle. Accordingly, the two signals received by the instrument may be compared to provide anti-tamper features.

The skilled person will also understand that the present disclosure is equally applicable to other services such as gas supply or water supply. Reference herein to electricity supply and electricity meters is by way of example only. The present disclosure equally relates to the supply of energy and energy meters.

A second embodiment will now be described in detail and in which a pre-paid module of the electricity meter is provided in an electric vehicle. It will be understood that the pre-paid module of the electricity meter is the part of the electricity meter that is arranged for contactless communication with the smartcard, and that is also holds a record of historic usage data of the electricity meter.

Other aspects of the electricity meter, for example, metrology and contactor aspects are provided in a charging station. In other words, the previously described electricity meter of the first embodiment can be considered and distributed between the vehicle and the charging station of the present embodiment.

Features of the embodiment described above are also, it is envisaged, features of this second embodiment. Further features, and further details of certain of the previously described features, will also now be described.

Figure 3:
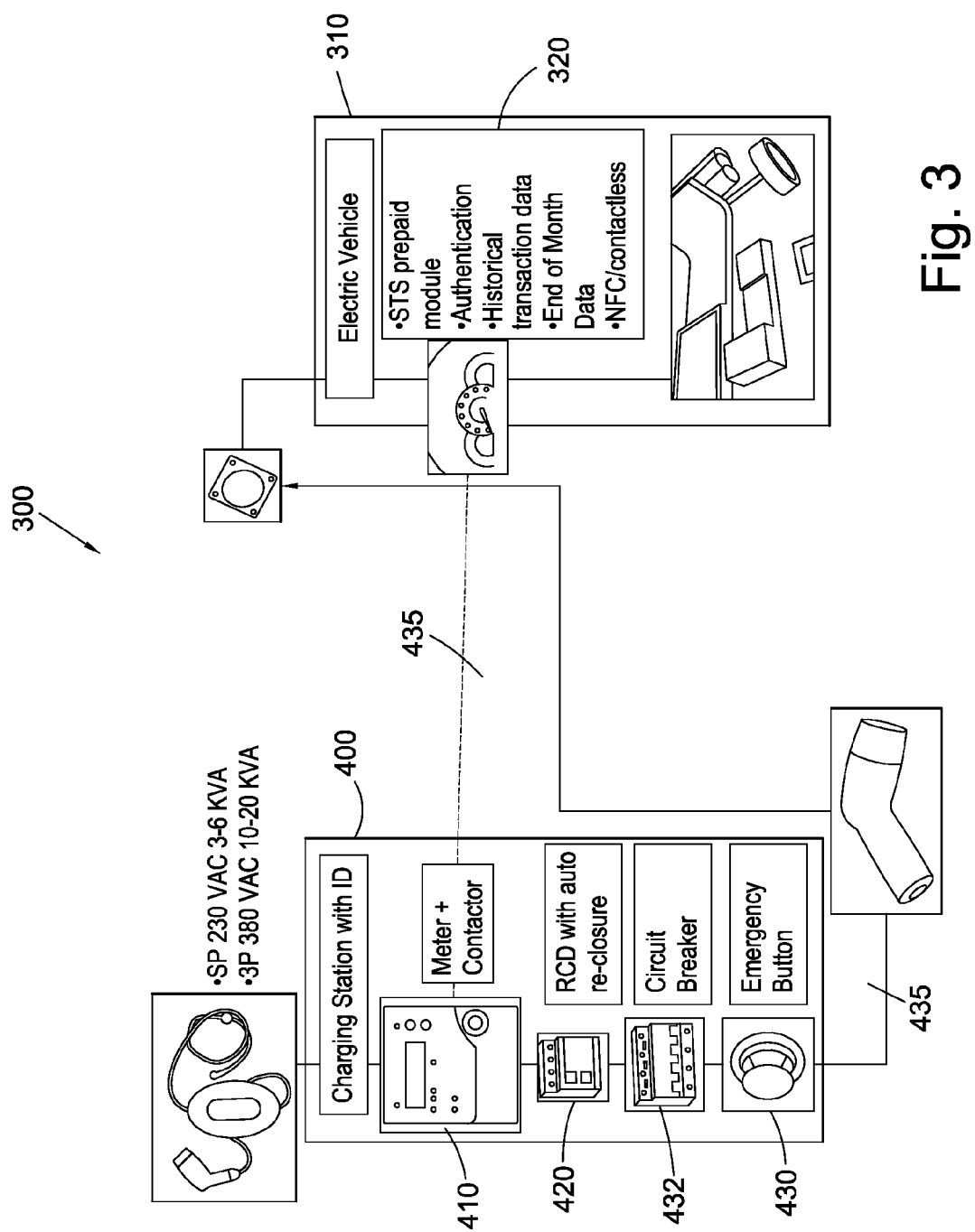
FIG. 3 shows hardware features of the system in accordance with embodiments of the present disclosure.

With reference to FIG. 3, a system 300 for charging an electric vehicle 310 is described. The system 300 includes an electric vehicle charging station 400 and the electric vehicle 310, with the electric vehicle 310 having the pre-paid module 320 installed in it.

Taking firstly the electric vehicle charging station 400, this is an electricity-supplying station to which the electric vehicle 310 can be connected for charging electricity storage means, which in this embodiment is a battery (not shown), provided in the electric vehicle 310 for powering the electric vehicle 310. The charging station 400 is, in this embodiment, a road-side charging station 400 mounted to project up from the pavement (sidewalk in US English), adjacent a parking bay in the road. In other embodiments, the charging station 400 may take other forms.

The charging station 400 is connected to receive a supply of electricity from a utility company, via an electricity distribution network (not shown). In this embodiment, the supply of electricity is a single-phase supply of 230 VAC. In other embodiments, the supply may differ. For example, the supply of electricity to the charging station 400 may be a three-phase supply of 380 VAC.

FIG. 3 shows hardware features of the system 300. With continued reference to FIG. 3, the charging station 400 also includes a meter and contactor 410 that is arranged to control the supply of electricity supplied by the charging station 400 and to record the amount of electricity supplied. The meter and contactor 410 is also arranged to record other information relating to the supply of electricity, including the time and date of supply and the identity of the electric vehicle 310 to which the electricity is supplied (as will become clearer below). The meter and contactor 410 operates under the control of a microprocessor of the charging station 400 (the microprocessor is shown only in FIG. 4 at 460). Continuing with FIG. 3, the charging station 400 also includes a residual current device (RCD) 420 that disconnects in a conventional manner the supply to the electric vehicle 310 in the event that a leakage of current is detected. An emergency button 430 is also provided in the charging station 400 that is arranged to be pressed by a user to operate a circuit breaker 432 to cut off the supply of electricity from the charging station 400 in an emergency. The charging station 400 also includes a socket (not show) for receiving a cable 435 arranged to supply electricity from the charging station 400 to the electric vehicle 310. The socket is arranged also to provide wired two-way data communication between the microprocessor 460 of the charging station 400 and the module 320 of the electric vehicle 310. In this embodiment, this data communication is by providing an additional connector that is separate from connectors that provide the current for charging the electric vehicle 310. In other embodiments, the data communication may be by power-line communication such that only connectors are provided for providing the charging current.

Returning to the present embodiment, the cable 435 is a single cable that includes within an external sheath both the conductors for carrying the charging current and separate conductors for the data communication.

Figure 4:
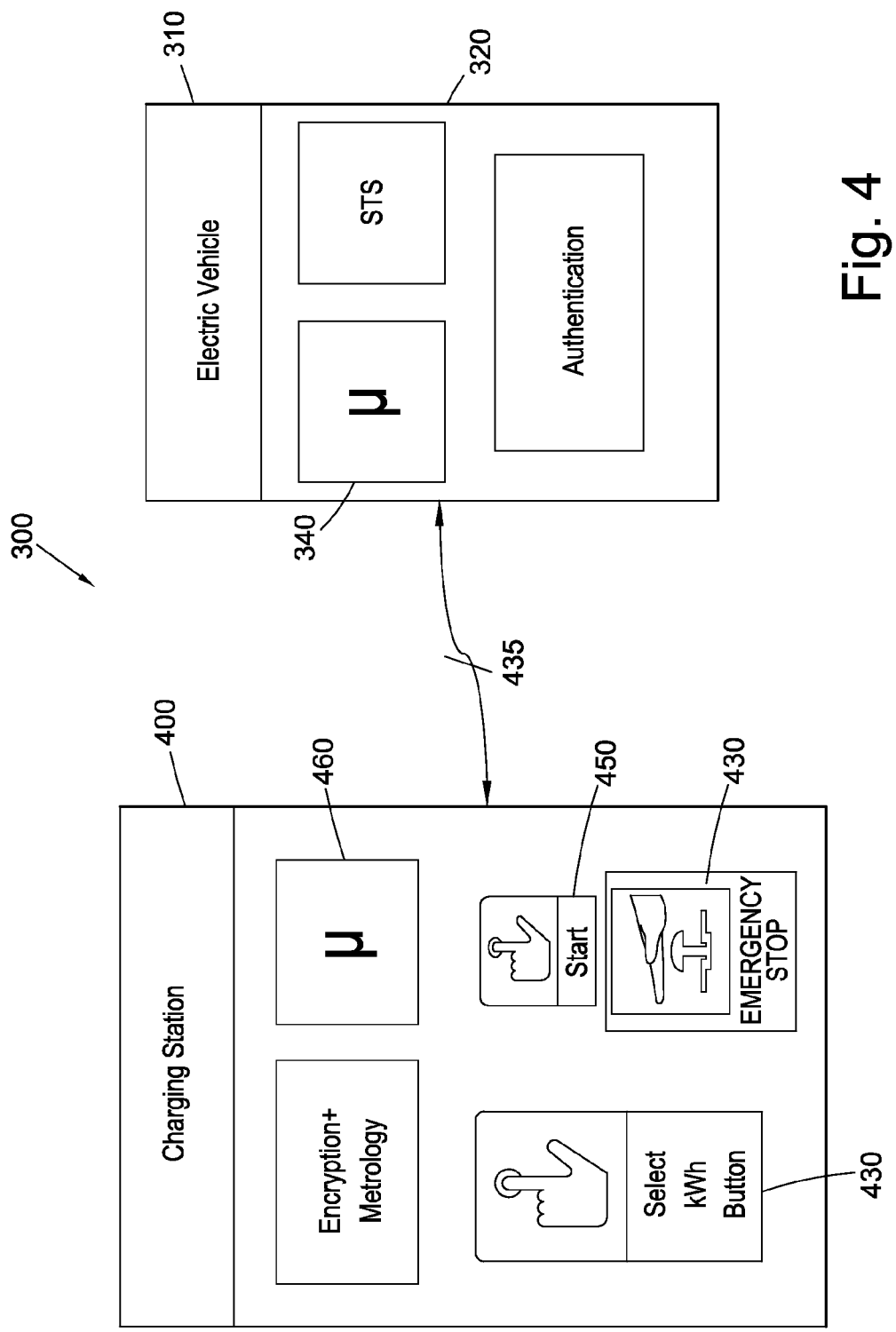
FIG. 4 shows certain features of the charging station that are more functional in accordance with embodiments of the present disclosure.

Certain features of the charging station are more functional and are shown only in FIG. 4. With continued reference to FIG. 4, the charging station 400 also includes a user interface in the form of selector buttons 440 for selecting the kWh of electricity to be supplied to the electric vehicle 310, and a start button 450 for starting the supply of electricity. Also shown in FIG. 4 is the microprocessor 460 that controls operation of the charging station 400. In particular, the microprocessor 460 is arranged to receive inputs from the selector buttons 440 and the start button 450, and to control operation of the meter and contactor 410. As will be clear when operation of the system 300 is described below, the microprocessor 460 carries out several functions. For safety reasons, the RCD 420 and circuit breaker 432 are not under the control of the microprocessor 460, but operate independently.

The module 320 of the electric vehicle 310 will now be described. Returning to FIG. 3, the module 320 is a pre-paid module arranged to communicate with a smartcard in a contactless manner using the STS protocol as was the case in the first embodiment described hereinabove with referent to FIGS. 1 and 2. The smartcard in this embodiment is envisaged as being substantially the same as that 109 of the first embodiment. The module 320 is arranged to receive information from the smartcard indicative of "credits" that have been pre-paid by a user using a terminal such as that 107 described in the first embodiment, and is also arranged to transmit to the smartcard information indicative of the usage of electricity, that is of electricity supplied by the module 320 to the battery of the electric vehicle 310. This information includes the information transmitted by the meter 111 in the first embodiment. Thus, the module 320 includes substantially all of the features of the meter 111 of the first embodiment.

The present module 320 of this second embodiment contains additional features. Specifically, and with reference to FIG. 3, the module 320 includes a socket 330 that is arranged to provide for connection to the charging station by means of the cable 435. The socket 330 is therefore substantially the same as the socket of the charging station 400 in having connectors for data communication with a microprocessor (shown only in FIG. 4 at 340) of the module 320 and having separate connectors for receiving the supply of charging current from the charging station 400.

Continuing the description of the module 320 now with reference to FIG. 4, the module 320 includes the microprocessor 340 previously mentioned that controls operation of the module 320. The microprocessor 340, as will be understood more fully when operation of the system 300 is described below, carries out several functions.

Operation of the system 300 will now be described. As will be understood by the skilled reader, operation of each of the charging station 400 and the module 320 is controlled by the respective microprocessor 460, 340 executing a method defined by respective instructions which the microprocessor is arranged to access, load and execute. It is envisaged that the instructions are stored locally in respective non-volatile memory to which each microprocessor 460, 340 has access. The description of the method of operation that follows will therefore be understood also to amount to a description of the stored instructions.

Figure 5:
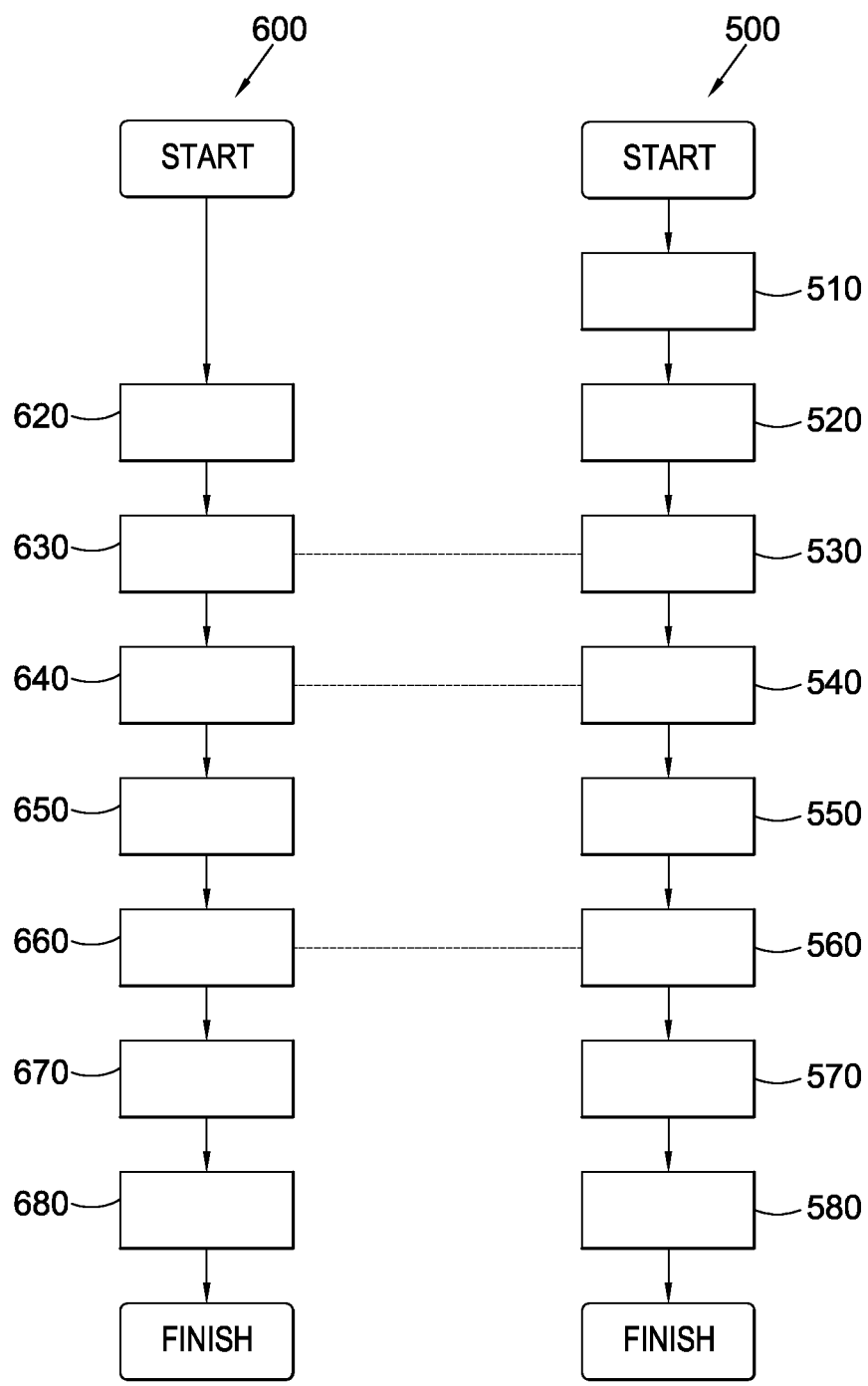
FIG. 5 shows the method of operation of the charging station and the method of operation of the module in accordance with embodiments of the present disclosure.

With reference to FIG. 5, the method of operation 600 of the charging station 400 and the method of operation 500 of the module 320 will both now be described.

At step 510, the smartcard, which is substantially the same as that 109 described in relation to the first embodiment, is brought adjacent the module 320 to transfer to the module in the manner previously described "credits" representing a value of electricity that has been pre-paid. The module 320 in turn transfers to the smartcard information relating to the use of electricity recorded by the module 320. This information includes the information described previously in relation to the first embodiment.

At step 520 the user of the electric vehicle 320 parks the vehicle 310 next to the charging station 400 and plugs the cable 435 between the socket 330 of the module 320 and the socket of the charging station 400. This also represents the first step 620 in operation of the charging station 400.

In step 630, the microprocessor 460 of the charging station 400 initiates communication with the microprocessor 340 of the module 320 to authenticate the module 320. This involves the charging station 400 sending a request for identification information to the module 320 and the module replying, at step 530 of its method, with identification information that is uniquely indicative of that module and hence of the electric vehicle 310 of which it forms part.

The charging station 400 checks the received vehicle identification information against a register of information identifying vehicles that are permitted to use the charging station. In this embodiment, this check is performed by accessing a stored version of the register stored locally at the charging station 400. In other embodiments, the check is performed by accessing the register at a remote location, such as the data centre of the first embodiment, over a data link between the charging station 400 and the data centre. In other embodiments, the charging station 400 additionally or alternatively records locally the information identifying the vehicle 400 that is to use the charging station 400 and reports periodically the identity of the vehicle, and other vehicles that have used the charging station 400, back to a data centre over a data link.

At step 640, the charging station 400 receives from the user a selection, via the selector buttons 440, of the kWh of electricity that is to be supplied to the electric vehicle 320 and, via the start button 450, confirmation of this selection and that charging is to start. The charging station 400 responds to these inputs by communicating with the module 320 to check that there is at least one credit held by the module 320. At step 540, the module 320 responds to this request by transmitting to the charging station 400 that it is authentic and charging process can start.

At step 650, if there is at least one credit, the charging station 400 closes the contactor of the meter and contactor 410 to allow electricity to be supplied to the electric vehicle 310. At step 550, if there is at least one credit, the module 320 informs the charging station to continue supplying electricity to the battery of the electric vehicle 310.

At step 660, when the meter and contactor 410 of the charging station 400 detects that the value of electricity that has been supplied equates to one credit, the charging station 400 sends a signal to the module 320 to deduct one credit from the module 320.

At step 670, when the meter of the charging station detects that the requested kWh of electricity has been supplied to the module 320, or when communication between the charging station 400 and the module 320 indicates to the charging station 400 that no credits remain on the module 320, the charging station 400 opens its contactor to stop the supply of electricity.

At step 680, the microprocessor 460 of the charging station 400 operates to update a local store (not shown) of historical usage data. This data comprises a list of each use of the charging station, the electric vehicle ID, kWh transfer, time stamp. For each use the information indicative of the module 320 and vehicle 310 is recorded, together with the date and time at which the charging was initiated and the kWh transferred.

At step 580, the microprocessor of the module 320 operates to update a local store (not shown) of historical usage data. This is the data that will be transmitted to the smartcard at the next opportunity for transmission back to the utility company in the manner described in the first embodiment. This data comprises data indicative of charging of the electrical vehicle. For each charging event, the information recorded includes the date and time at which the charging was initiated and the kWh transferred.

The charging station 400 also operates to automatically open its contactor if substantially no kWh has been transferred after 1 minute. In this embodiment, the threshold for this is set at 1 A.

After step 680, operation of the charging station 400 ends and the charging station 400 goes into a condition in which it waits for the next operation. After step 580, operation of the module 320 ends and the module 320 goes into a condition in which it waits for the next operation The invention is not restricted to the described embodiments but extends to the full scope of the appended claims.

The invention claimed is:

1. A method of managing a supply of electricity to an electric vehicle, the method comprising:
transferring, via contactless communication, first data from an electricity meter to a portable storage medium; and
transferring, via contactless communication, second data from the portable storage medium to the electricity meter, wherein the second data comprises instruction for the electricity meter to supply electricity;
wherein at least a pre-paid module of the electricity meter is fitted to the electric vehicle and is arranged for connection to a charging station for communication therewith for the management of the supply of electricity from the charging station to the electric vehicle, the pre-paid module being arranged to carry out transmission of the first data and receipt of the second data, the charging station comprising the electricity meter and a contactor of the electricity meter.

2. The method of claim 1 wherein the first data is historical data collected by the electricity meter in relation to the electricity supply.

3. The method of claim 1, wherein the second data comprises data which complies with Standard Transfer Specification "STS" protocol.

4. The method of claim 3 wherein the data which complies with the STS protocol comprises a 20-digit encrypted number.

5. The method according to claim 1, wherein following connection of the pre-paid module to the charging station, the charging station communicates with the pre-paid module to ascertain the identity of the pre-paid module, and hence of the electric vehicle to which it is fitted.

6. The method according to claim 5, wherein the charging station verifies an identity of the pre-paid module against a record of modules to which the charging station has local or remote access.

7. The method according to claim 1, wherein the charging station receives an input from a user to select a quantity of electricity to be supplied to the electric vehicle.

8. The method according to claim 1, wherein the charging station communicates with the pre-paid module to ascertain a predetermined quantity of electricity that the electricity meter has been instructed to supply.

9. The method according to claim 8, wherein the charging station starts to supply electricity to the electric vehicle if the predetermined quantity of electricity is deemed sufficient, for example by being above a certain value, such as a value selected by a user or a predetermined minimum value.

10. The method according to claim 1, wherein the charging station records data indicative of the supply of electricity to the electric vehicle, optionally in a store of historic usage date to which the charging station has access, the store optionally a local or a remote store, the data recorded optionally comprising the date and/or time of charging and/or the kWh transferred.

11. The method according to claim 5, wherein connection of the pre-paid module to the charging station is made by connecting a charging cable between the electric vehicle and the charging station, the charging cable arranged to supply electricity from the charging station to the electric vehicle, the communication between the charging station and the pre-paid module also being via the charging cable.

12. The method of claim 1, wherein the method is performed by the pre-paid module.

13. An electricity meter arranged to:
transmit, via contactless communication, first data to a portable storage medium; and
receive, via a contactless communication, second data from the portable storage medium, wherein the second data comprises instruction for the electricity meter to supply electricity;
wherein the electricity meter is for installing in a vehicle to supply electricity to the vehicle, and is arranged for connection to a charging station to receive electricity therefrom for supply to the vehicle.

14. The electricity meter as claimed in claim 13 wherein the first data is historical data collected by the electricity meter.

15. The electricity meter as claimed in claim 13 wherein the instruction for the electricity meter to supply electricity is instruction for the electricity meter to permit supply of a predetermined quantity of electricity.

16. The electricity meter of claim 13, wherein the second data comprises data which complies with Standard Transfer Specification "STS" protocol.

17. A vending terminal for purchasing electricity, the vending terminal arranged to:
receive, via contactless communication with a portable storage medium, first data from an electricity meter; and
transmit, via contactless communication, second data to the portable storage medium, wherein the second data comprises an instruction for the electricity meter to supply electricity.

18. The vending terminal as claimed in claim 17 wherein the first data is historical data collected by the electricity meter and related to a supply of electricity supplied by the electricity meter.

* * * * *